United States Patent [19]
Masuoka et al.

[11] Patent Number: 5,928,360
[45] Date of Patent: Jul. 27, 1999

[54] SHARED COMPUTER SYSTEM FOR SELECTIVE EXECUTION OF FUNDAMENTAL SOFTWARE

[75] Inventors: Yoshimasa Masuoka, Kodaira; Toyohiko Kagimasa, Sagamihara; Fumio Noda, Kodaira; Katsuyoshi Kitai, Tokyo; Shigekazu Inohara, Kokubunji, all of Japan

[73] Assignee: Hitachi, Ltd., Tokyo, Japan

[21] Appl. No.: 08/826,522

[22] Filed: Apr. 3, 1997

[30]       Foreign Application Priority Data

Apr. 8, 1996   [JP]   Japan ................................. 8-084942

[51] Int. Cl.[6] ................................................. G06F 9/445
[52] U.S. Cl. ............................... 713/2; 707/10; 709/219
[58] Field of Search ......................................... 395/651, 652, 395/712, 200.33, 200.5, 200.51–200.53, 200.56, 800.28–800.31; 707/10; 709/304, 201, 203, 217–223, 249, 252; 712/28–31, 200; 713/1, 2

[56]                 References Cited

U.S. PATENT DOCUMENTS

| | | | |
|---|---|---|---|
| 5,428,803 | 6/1995 | Chen et al. ..................... | 395/800.29 X |
| 5,594,910 | 1/1997 | Filepp et al. ..................... | 395/800.28 |
| 5,649,105 | 7/1997 | Aldred et al. ..................... | 395/200.5 |
| 5,761,380 | 6/1998 | Lewis et al. ..................... | 395/712 X |
| 5,832,219 | 11/1998 | Pettus ............................... | 709/304 X |
| 5,838,910 | 11/1998 | Domenikos et al. .............. | 709/217 X |

FOREIGN PATENT DOCUMENTS 4-311252   11/1992   Japan .

OTHER PUBLICATIONS

"Winframe/Enterprise Product Fact Sheet" by Citrix Systems, Inc. at Internet:http://www.citrix.com/prodback.htm.
"Unix Network Programming," by W. Richard Stevens, pp. 171–196 (1991).
X Window System Programming, By Nabajyoti Barkkati, Sams Pub., pp. 3–20, 1994.

*Primary Examiner*—Thomas M. Heckler
*Attorney, Agent, or Firm*—Antonelli, Terry, Stout & Kraus, LLP

[57]              ABSTRACT

A computer system, which is intended for easy introduction of architectures and fundamental softwares used by users, includes one or more first computers which implement the user interface function, one or more second computers which run application programs, and a third computer which administrates the first and second computers. A first computer turned on by a user operates on the third computer to assign a second computer for running a fundamental software which controls the execution of a user's application program. The assignment of a computer which runs the fundamental software for the user's application program at the time of user request facilitates the introduction, administration and operation of fundamental softwares and computers.

25 Claims, 9 Drawing Sheets

STACK TABLE

| STACK ID | STACK TYPE | ARCHITECTURE NAME | FUNDAMENTAL SOFTWARE NAME | TERMINAL ID |
|---|---|---|---|---|
| 0 | BASE STACK | | | |
| 1 | COMPUTING STACK | ARCHITECTURE A | FUNDAMENTAL SOFTWARE P | TERMINAL X |
| 2 | COMPUTING STACK | ARCHITECTURE A | EMPTY | EMPTY |
| 3 | COMPUTING STACK | ARCHITECTURE A | FUNDAMENTAL SOFTWARE Q | EMPTY |
| 4 | COMPUTING STACK | ARCHITECTURE B | FUNDAMENTAL SOFTWARE R | TERMINAL Y |
| 5 | STORAGE STACK | | | |
| | | | ⋮ | |

ACCESS TERMINAL ADDRESS (TERMINAL ID)

STACK ADDRESS

BASE STACK ADDRESS

USER ID

FIG. 9

SHARED COMPUTER SYSTEM FOR SELECTIVE EXECUTION OF FUNDAMENTAL SOFTWARE

BACKGROUND OF THE INVENTION

The present invention relates to an information processing system using a network, and particularly to an information processing system including multiple computers and which utilizes a network.

There are two kinds of computer system configurations generally known at present. One is based on personal computers (PCs) which are placed atop the desks of individual users who run their application programs exclusively on their PCs. Each user has his/her application programs and files stored in the storage device (e.g., magnetic disk) built in the PC, and runs a program by loading it into the main memory of the PC. This computer system will be called here "PC system". The user starts the PC system by simply turning on its power, and fundamental software is loaded into the main memory and is run so that the PC is ready to run an application program specified by the user. The fundamental software is known as a group of programs, including an operating system, prepared for administration and control of program execution and input/output operation. The term "fundamental software" is used in the present specification to express such a group of programs.

Another configuration is based on the user's computers called "X terminals" and another computer called a "server" all linked through a network, with the server running all application programs while each X terminal functioning user interface (function to control the associated input/output devices and the interface between the application program and input/output devices), as described in publication "X Window System Programming, Second Edition" by Nabajyoti Barkakati, SAMS Publishing, pp.3–20 (1994). Each user has his/her application programs and files stored in the server's storage device (e.g., magnetic disk), and operates on the server to load the program into the main memory and run the program. This computer system will be called here "X terminal system".

Figure 5:
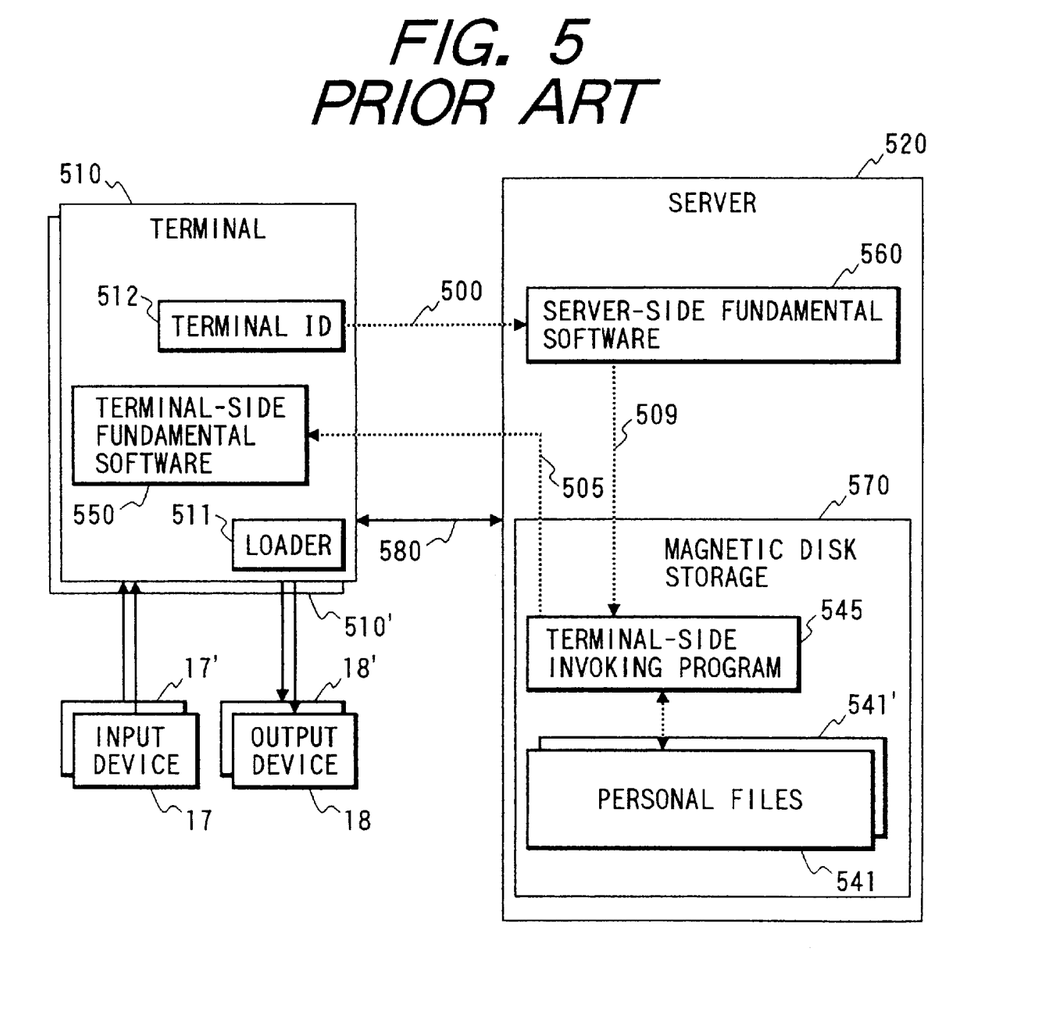
FIG. 5 is a block diagram showing the terminal start-up operation of the conventional computer system.

FIG. 5 shows the operation of the X terminal system during the use by a user. The figure shows multiple terminals, i.e., two terminals 510 and 510' in this example, connected to a server 520 through a network 580. The terminal 510 (or 510') and server 520 are computers each having a processor and main memory (not shown). The server 520 further has a magnetic disk storage 570, with its contents being accessed by programs that are run by the server 520.

The terminal 510 (or 510') has a loader 511 and a record of terminal identification (ID) 512. The loader 511 is a program which is run by the processor in the terminal 510 immediately after the terminal 510 is initialized, e.g., at the time of power on, and it functions to fetch a program from the server 520. The terminal ID 512 is a numeric code specific to each terminal. By addressing a terminal in terms of the terminal ID, a program which is being run by the server 520 can communicate with the program in the terminal through the network 580. The terminal 510 (or 510') is connected with input devices 17 and 17' and output devices 18 and 18'.

The server 520 has server-side fundamental software 560 which is run by its processor, and is equipped with a magnetic disk storage device 570 which stores terminal start-up programs (terminal-side fundamental software) 545 which are run by the terminals 510 and 510' and user files 541 and 541'.

In operation, the user initializes the terminal 510. Then, the loader 511 is run to read out and send the terminal ID 512 to the server-side fundamental software 560, as indicated by a dotted line with an arrow 500. Dotted lines with arrows are used in the present specification to express flow of a command, a signal or data between programs or between a program and a file, etc. Receiving the terminal ID 512, the server-side fundamental software 560 accesses the disk storage device 570, as indicated by a line 509, to read out the terminal start-up program 545, and sends it to the loader 511 of the terminal 510, as indicated by line 505. The loader 511 loads the received terminal start-up program 545 into the main memory and runs the program. The terminal 510 is now ready to run an application program specified by the user.

However, the conventional kinds of computer systems described above have the following problems.

The PC system needs to store newly introduced application programs in the storage devices of all user's PCs, and therefore it requires an intricate software management job. In contrast, the X terminal system, in which all application programs are run by the server, merely needs to store newly introduced application programs in the server's magnetic disk storage. However, since all application programs are run under control of the server-side fundamental software, individual user's demands of different architectures, different fundamental softwares and exclusive use of a computer cannot be accommodated.

SUMMARY OF THE INVENTION

A first object of the present invention is to provide a computer system which is easy in administration and operation, and more particularly provide a computer system which requires less time and labor for the introduction or replacement of application programs and hardware devices.

A second object of the present invention is to provide a computer system which accomodates extensive demands of users, and more particularly provide a computer system which meets demands of users each requiring a certain fundamental software run by a certain processor based on a certain architecture for running an application program, so that individual users run their application programs with the feel of using personal computers based on fundamental softwares specified by themselves.

Specifically, the present invention resides in a computer system formed of one or more first computers which implement a user interface function, one or more second computers which run application programs, and a third computer which administrates the second computers. The third computer communicates with one of the first computers, which has been initialized by a user, thereby to select one of the second computers that meets the user's demand and assigns the selected second computer to the user. The assigned second computer communicates with the third computer and runs the fundamental software requested by the user so that the system is ready to run a user's application program. The third computer communicates with the first computer so that the first computer can communicate with the second computer.

The present invention further resides in a method of operation of a computer system including one or more first computers, one or more second computers, a third computer and a network which links these computers, and running application programs specified by one or more users. The method comprises a step conducted by one of the first computers at initialization thereof by a user of transmitting a user's request to the third computer, a step conducted by the third computer of finding the fundamental software requested by the user, a step conducted by the third computer of designating one of the second computers that meets the user's request, a step conducted by the third computer of communicating with the assigned second computer, a step conducted by the second computer of starting the fundamental software requested by the user, and a step conducted by the third computer of communicating with the first computer so that the first computer can communicate with the second computer.

The present invention resides further still in a computer system formed of one or more first computers which implement a user interface function for specifying a software used to run a user's application program, one or more second computers which run application programs, a third computer which designates a computer out of the second computers for running the software, and a network which links the first, second and third computers.

Based on the inventive computer system, in which the user interface function is implemented by the first computers and application programs are run by the second computers, it becomes possible to carry out the intensive management of the second computers, thereby facilitating the operation of the computer system. Users are allowed to specify fundamental software to be run by the second computers, and the inventive computer system can meet extensive demands regarding the fundamental software of individual users.

DESCRIPTION OF THE PREFERRED EMBODIMENTS

Figure 7:
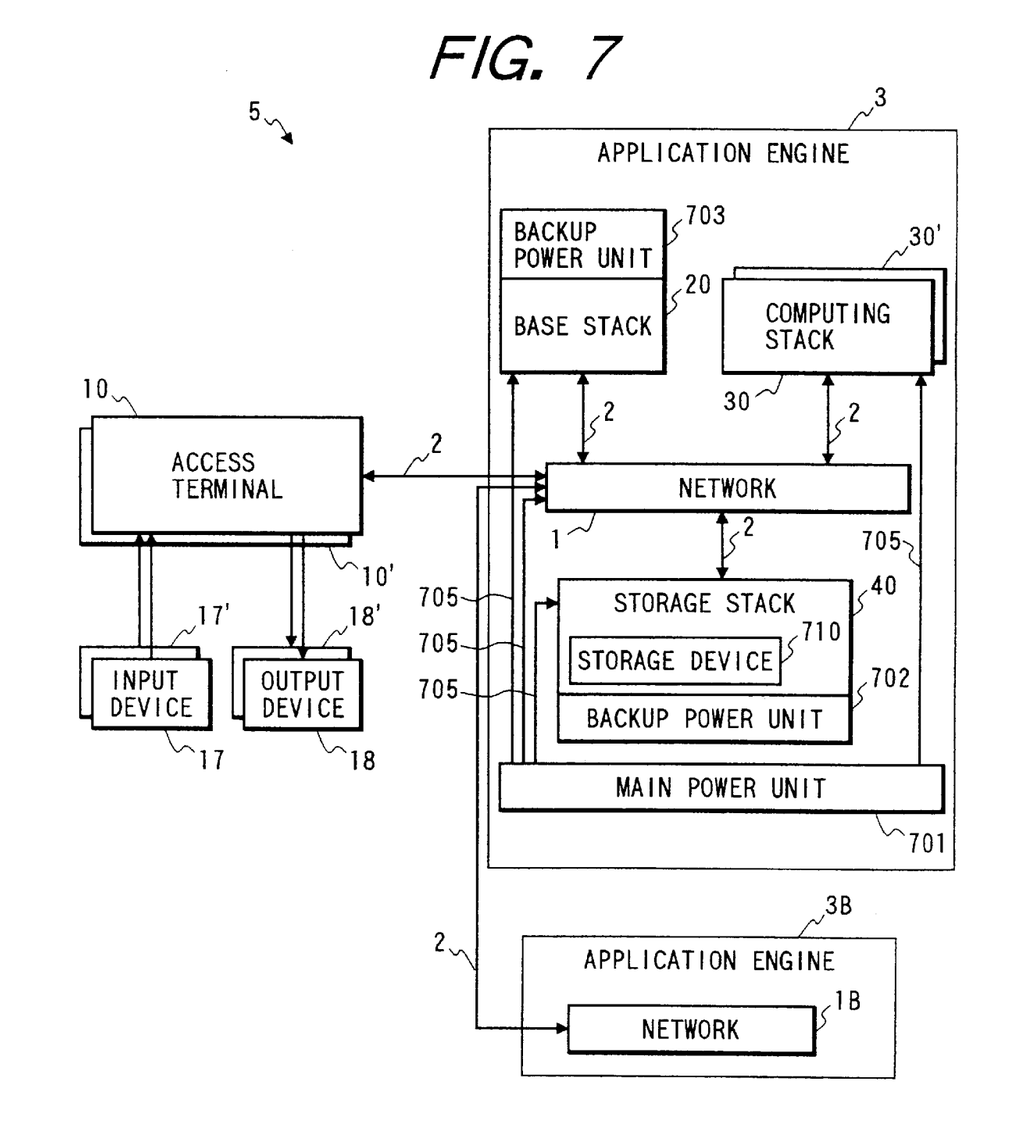
FIG. 7 is a block diagram showing the hardware arrangement of the computer system of this embodiment of invention.

An embodiment of the present invention will be explained with reference to the drawings.
(1) Hardware Arrangement FIG. 7 shows the hardware arrangement of the computer system based on an embodiment. The computer system 5 consists of one or more (two in this example) access terminals 10 and 10', and one or more (one is shown in this example) application engine 3 which is a processor for running application programs.

The access terminal 10 (or 10'), which provides the user interface for system users, is equipped with one or more input devices 17 and 17' such as a mouse device and keyboard, and one or more output devices 18 and 18' such as a display unit and speaker. Information entered by the user with the input device 17 (or 17') is passed to the user's application program, and information produced by the application program is delivered to the output device 18 (or 18').

The access terminal 10 (or 10') is connected to a network 1 of the application engine 3, i.e., the terminals are connected to the application engine through the network. When the computer system includes more than one application engine, each access terminal is connected to one of the application engines.

The access terminal 10 is a computer incorporating one or more processors and a main memory (these are not shown in FIG. 7), and it can run a program by loading it in the main memory. This program is mainly fetched from the application engine 3 through the network 1, or it may be fetched from other application engine 3B or introduced through the associated input device 17.

The application engine 3 is a computer which runs a user's application programs, and it comprises various devices called "stacks" connected by the network 1 and cable 2 and a main power unit 701 built in the application engine which supplies power through a power cable 705. Stacks include a base stack 20, one or more storage stacks 40, and one or more computing stacks 30 and 30'. Each stack is a computer having one or more processors and a main memory (these are not shown in FIG. 7), and it can run a program by loading it in the main memory.

The computing stack 30 (or 30') runs a user's program. The user operates on the input device 17 (or 17') connected to the access terminal 10 to specify an application program to be run by the computing stack 30, as will be explained in detail in connection with FIG. 3. The computing stack 30 has a certain architecture (hardware arrangement inclusive of the type of processor), and individual computing stacks 30 and 30' connected to one application engine 3 may have different architectures.

The base stack 20 controls the status of all stacks connected to the network 1 of the application engine 3 by transacting management information with them by way of the network 1. At the start-up of the access terminal 10 by the user, the base stack 20 assigns an empty (not used by other user) computing stack 30 to the user. The base stack 20 having a crucial role of controlling the whole stack status is equipped with an exclusive backup power unit 703 with the intention of providing the enhanced reliability against the failure of the main power unit 701.

The storage stack 40 includes a large-capacity storage device, e.g., magnetic disk storage, for storing user files, fundamental softwares to be run by the access terminal 10 and computing stack 30, and application programs to be run by the computing stack 30. The storage stack 40 having a crucial role of the computer system is equipped with a backup power unit 702 for providing enhanced reliability.

The base stack 20 and storage stack 40 may be integrated as a single unit, instead of being built as separate units and connected independently to the network 1 in this embodiment.

The network 1 links the base stack 20, computing stacks 30 and 30' and storage stack 40 within the application engine 3 and the access terminals 10 and 10'. If the computer system includes another application engine 3B, the network 1 is connected to the network 1B of the application engine 3B. That is, the network 1 serves as a signal path among the stacks within the application engine 3, and it can also be used for the communication path among the access terminal, stacks and other application engine 3B. The networks 1 and 1B extend across the computer system, although they are shown to exist within the application engines 3 and 3B in FIG. 7. Alternatively, the application engines 3 and 3B may share a single network.

The network 1 is connected to each unit device through a network interface (not shown in FIG. 7). Each network interface has the assignment of a unique network address (will be termed simply "address").

The communication takes place between the access terminal 10 and base stack 20, or between the base stack 20 and computing stack 30, for example, based on their addresses as follows. The sending unit issues a command with the address of the receiving unit and the address of main memory location where data to be sent is stored to the associated network interface. Then, the data is transferred over the network (or more than one network in case more than one application engine exists), and received by the network interface having the assignment of the address specified by the sending unit and stored in the main memory location specified by the receiving unit.

The communication scheme for accomplishing the function of "correctly delivering data to the receiving unit with its network interface having the assignment of the address specified by the sending unit" is described in detail in the article entitled "UNIX Network Programming" by W. Richard Stevens, in Prentice-Hall, pp.171–196 (1991), and the detailed explanation of this communication scheme adopted by the computer system of this embodiment will be omitted.

Figure 8:
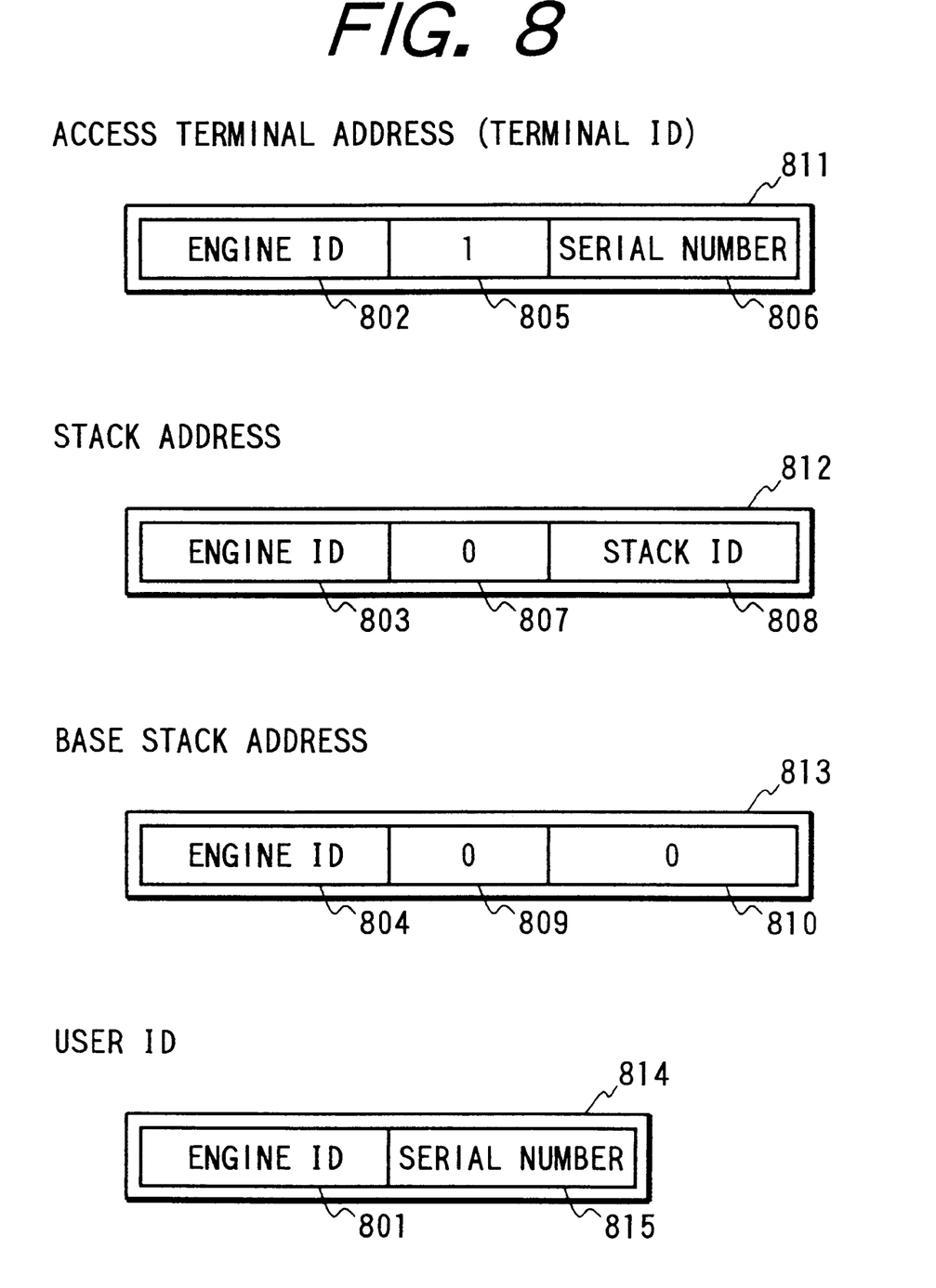
FIG. 8 is a diagram showing the contents of the terminal address, stack address and user ID.

FIG. 8 shows the network address assignment for the network interfaces of the access terminals and stacks. Messages, data and signals are transacted among the stacks and between the access terminals and stacks through the network based on these addresses.

The network address consists of three fields for engine ID, ID code, and serial number. The engine ID is a unique number used to distinguish among application engines within the computer system, and it may be derived from the production number of the application engine for example. The address of an access terminal (terminal ID), address of a stack and address of a base stack will be explained in the following, and the user ID will be explained later as well.

The address of an access terminal is expressed as shown by 811 in FIG. 8. The engine ID 802 is derived from the engine ID of the application engine to which the access terminal is connected. (Each access terminal is connected to one of application engines within the computer system.) The ID code 805 is "1" indicative of an access terminal address. The serial number, which is used to distinguish among access terminals connected to the same application engine, is determined arbitrarily, e.g., serial number of the device given by the manufacturer.

The address of a stack (except for the base stack) is expressed as shown by 812 in FIG. 8. The engine ID 803 is derived from the engine ID of the application engine in which the stack is installed. The ID code 807 is "0" indicative of an application engine address. The stack ID 808 is used to distinguish among stacks within the application engine, and it is a unique number excluding "0" that is assigned invariably to the stack ID 810 of the base stack which includes the same engine ID 804 and ID code 809 as those 803 and 807 of other stacks. Accordingly, the base stack address is determined simply from the engine ID of the application engine.

In this manner, the access terminals and stacks have their addresses assigned uniquely within the computer system including multiple application engines, and each access terminal or stack can send data to receiving units correctly based on their addresses.

(2) Software Organization

The software organization (programs and data) of the computer system 5 of this embodiment will be explained with reference to FIG. 1.

The access terminal 10 runs the terminal-side loader 11 and terminal-side fundamental software 50. The terminal-side loader 11 is resident in the non-volatile memory in the main memory of the access terminal 10, and it is run immediately after the access terminal 10 is turned on. In the following explanation, the phrasing "access terminal is turned on" indicates either that power is turned on, or that the access terminal is initialized on a hardware or software basis. The main role of the terminal-side loader 11 is to prompt the assignment of a computing stack 30 by sending the user ID 14 and terminal ID 12 to the stack manager 21 in the base stack 20 at the start-up of the access terminal 10, and to receive the program of terminal-side fundamental software 50 from the file server 41 in the storage stack 40, load it in the main memory, and run the program. Setting of the user ID and terminal ID will be explained later.

Each access terminal 10 has data of terminal ID 12, which is stored in the non-volatile memory in the main memory, and it is identical to the access terminal address 811 explained regarding FIG. 8. The terminal ID is sent to the base stack 20 as the address of receiving unit of the terminal-side fundamental software when the user turns on the access terminal 10. In addition, each access terminal 10 has data of user ID 14 for distinguishing among users of the computer system 5, and it consists of an engine ID 801 and a serial number 815 as shown by 814 in FIG. 8. The engine ID is equal to the engine ID of the application engine 3 with its storage stack 40 storing the personal files 42. The serial number 815 is used to distinguish among users who have the same engine ID, and it is determined arbitrarily, e.g., it may be derived from the user's membership number.

The user ID 814 includes the engine ID 801 so that the personal files 42 can be accessed from any application engine in case the computer system includes multiple application engines.

The terminal-side fundamental software 50 is read out of the storage device of the storage stack 40 by the file server 41, and it is run by being transferred and loaded into the main memory of the access terminal 10 at the start-up of the access terminal 10. The terminal-side fundamental software 50 is unique to each user who starts the access terminal 10. The terminal-side fundamental software 50 runs in the access terminal 10 throughout the period after the user starts the access terminal 10 until the user finishes the job, and it functions to transfer data entered on the input device 17 of the access terminal 10 to the application program 7 which is run by the computing stack 30 and deliver the output of the application program 7 to the output device 18, as will be explained later in connection with FIG. 3.

The computing stack 30 runs the stack-side loader 31 and stack-side fundamental software 60. The stack-side loader 31 has a main role of receiving a program from the file server 41 and running the program as the stack-side fundamental software 60 by loading it into the main memory of the computing stack 30 at the start-up of the access terminal 10. The stack-side loader 31 is resident in the non-volatile memory in the main memory of the computing stack 30, and it is run immediately after the computing stack 30 is initiated.

The stack-side fundamental software 60 is stored in the storage stack 40, and it is transferred by the file server 41 and run in the main memory of the computing stack 30 at the start-up of the access terminal 10. The stack-side fundamental software 60 is unique to each user who starts the access terminal 10. The stack-side fundamental software 60 runs in the computing stack 30 throughout the period after the user starts the access terminal 10 until the user finishes the job, and it functions to control the execution of the application program 7 in the computing stack 30 and transfer input/output data of the application program 7 to the file server 41 and terminal-side fundamental software 50.

The storage stack 40 runs the file server 41, which has three main roles: (1) It receives the user ID from the stack manager 21 (which will be explained later) at the start-up of the access terminal 10, makes reference to the user file 42 of the user of that ID and the fundamental software 47, and sends the fundamental software name 44 of the fundamental software specified by the user and the architecture name 45 of the computing stack that can run the fundamental software to the stack manager 21. (2) It receives the terminal ID, stack ID and fundamental software name from the stack manager 21 at the start-up of the access terminal 10, reads out the fundamental software (terminal-side program and stack-side program) from a storage device (indicated by 710 in FIG. 7, but not shown in FIG. 1), and sends the terminal-side program to the access terminal 10 and the stack-side program to the computing stack 30 based on the terminal ID and stack ID. (3) It receives the file input/output request from the stack-side fundamental software 60, operates on the storage device to carry out the requested file input/output, and reports the execution to the stack-side fundamental software 60.

Figure 1:
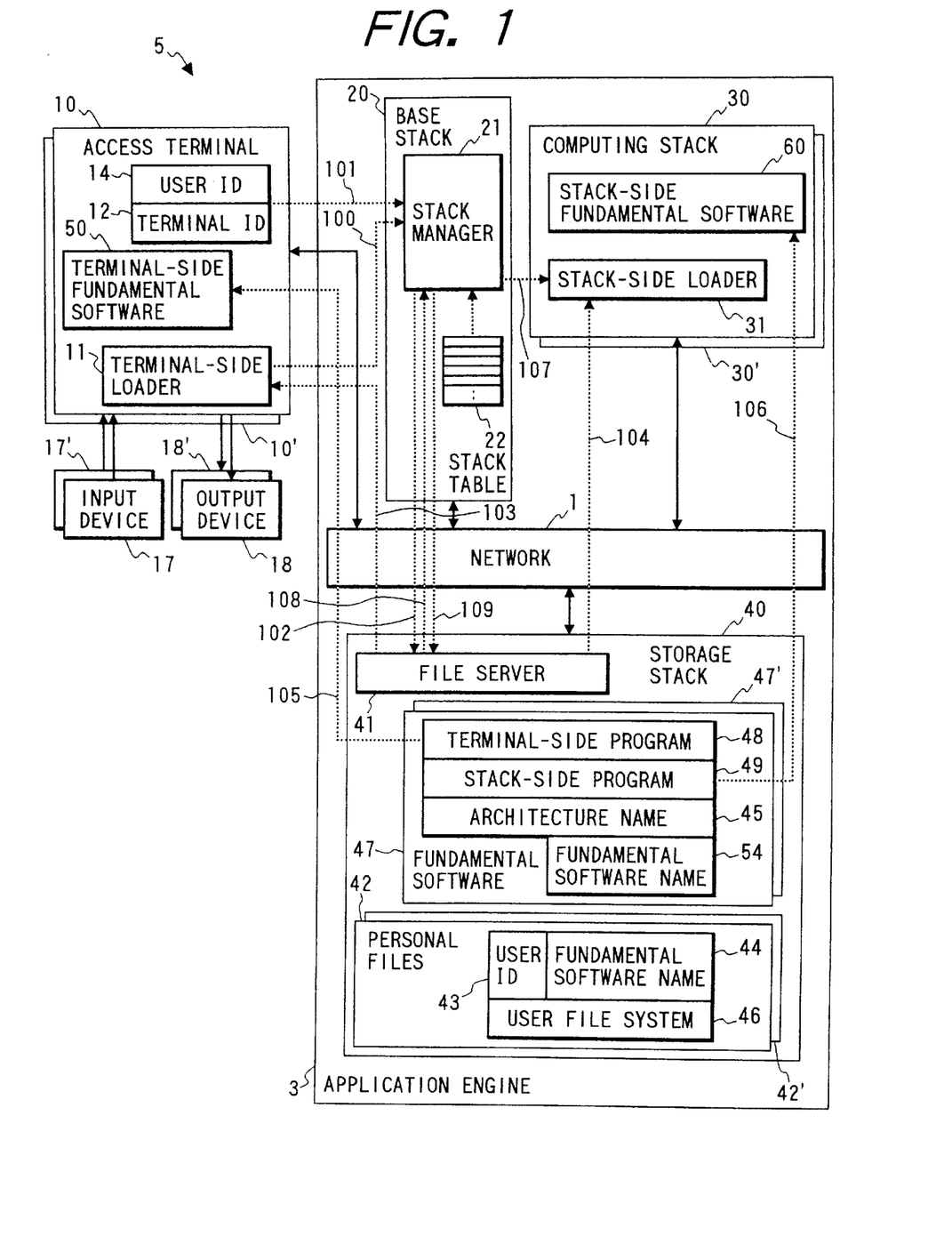
FIG. 1 is a block diagram showing the software organization of the computer system and the start-up operation of the access terminal based on an embodiment of this invention.

The storage device of the storage stack 40, as indicated by 710 in FIG. 7, but not shown in FIG. 1, stores one or more personal files 42 and 42', and one or more fundamental softwares 47 and 47'. The personal files 42 comprise a user file system 46 which is a set of files accessed by a certain user, a fundamental software name 44 which is the name of the fundamental software used by the user, and a user ID 43 of the user. The fundamental software name 44 has its content derived from the name of the fundamental software intended to run by the user during the use of the computer system 5. Namely, when the user starts the access terminal 10, the fundamental software name 44 is referenced, and the fundamental software specified by the user is sent for execution to the access terminal 10 and computing stack 30, as will be explained in detail later. The user having the user ID 43, who got the assignment of a computing stack at the start-up of the access terminal, can access to the contents of the user file system 46 within the user file 42 byway of the file server 41 by running the application program in the computing stack, as will be explained in connection with FIG. 3.

The personal files 42 can be subjected to the dynamic setup alteration when a new user joins the computer system or when a user retires from the computer system. For this purpose, this embodiment introduces a special user ID so that a user having this user ID can access to any location of the storage device 710 within the storage stack 40. For example, for a newly joining user of the computer system, a user having the special user ID makes a user file area in a blank area of the storage device 710 and gives the user ID and fundamental software name of the new user to the respective items of the personal files. This series of operation is carried out by running the administration program in the base stack or storage stack.

The fundamental software 47 includes a terminal-side program 48, a stack-side program 49, an architecture name 45 and fundamental software name 54. The terminal-side program 48 and stack-side program 49 are sent and run in the access terminal 10 and computing stack 30 in response to the designation of the fundamental software at the start-up of the access terminal 10. The computing stacks 30 and 30' equipped in the application engine 3 have different architectures, as mentioned previously, and accordingly not all of the stack-side programs 49 of the fundamental software 47 can be run by the computing stack. On this account, a name of an architecture that can run the stack-side programs 49 of the fundamental software 47 is given to the architecture name 45. The name of fundamental software 47 is given to the fundamental software name 54.

The user can specify an intended fundamental software 47 at the use of the computer system 5 by setting the fundamental software name of the fundamental software 47 for the fundamental software name 44 of one's own personal files 42.

The base stack 20 runs the stack manager 21. The main role of the stack manager 21 is to monitor the states of the stacks equipped in the application engine 3, and, in response to the starting of the access terminal 10 by a user, to find a computing stack which is empty and can run the fundamental software specified by the user and assign it to the user. The stacks of the application engine 3 have their states indicated to the stack table 22, which is revised by the stack manager 21 at the occurrence of a change in the state of each stack.

Figure 2:
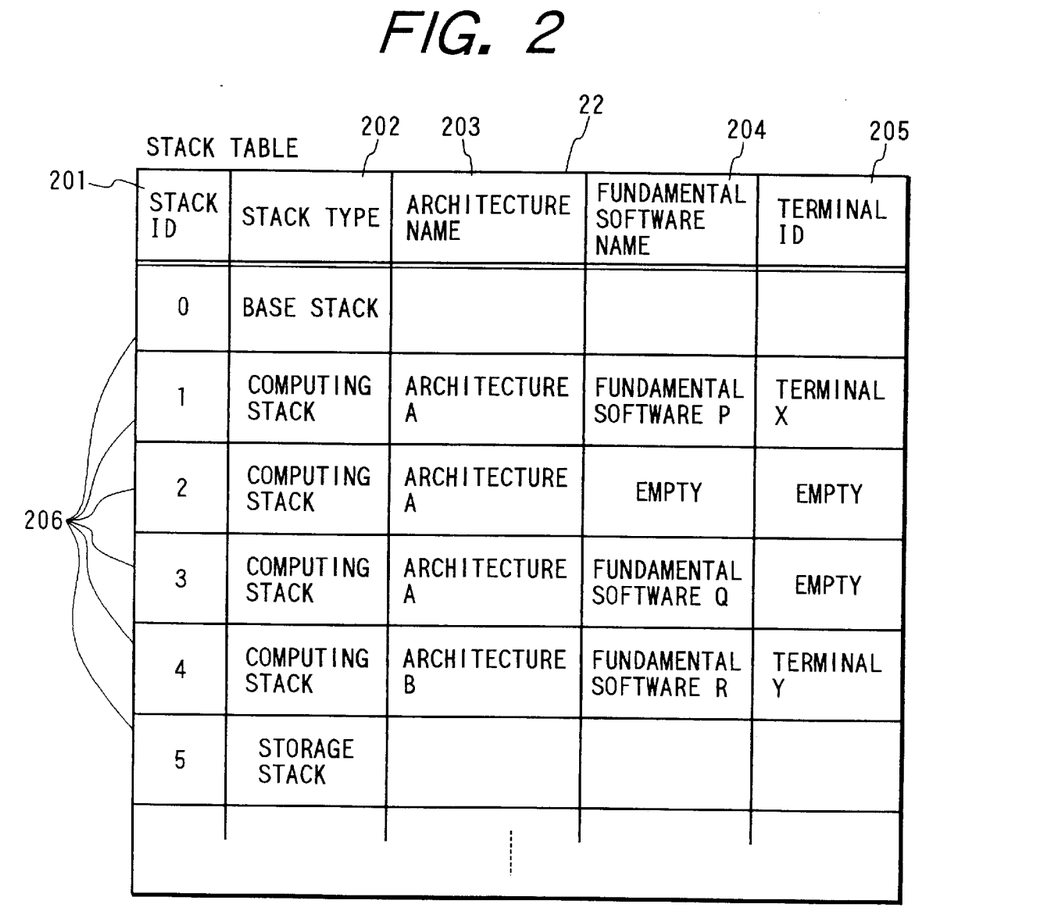
FIG. 2 is a table showing the structure and contents of the stack table of this embodiment.

FIG. 2 shows the structure of the stack table 22. The stack table 22 has entries 206 in correspondence to the stacks. Each entry 206 includes fields of stack ID 201, stack type 202, hardware architecture 203, fundamental software 204 and terminal ID 205.

The stack ID field 201 sets the stack ID relevant to the entry. The stack address is known from the combination of the stack ID 201 and engine ID, as mentioned previously. By making reference to the stack table 22, the stack manager 21 can send data to any stack of the application engine. The stack ID of the entry 206 for the base stack 20 is invariably "0" for it is derived from the stack ID of the base stack 20.

The stack type field 202 is to set the name of stack type, i.e., "base stack", "computing stack", "storage stack", etc., for the entry. The remaining fields of architecture name 203, fundamental software name 204 and terminal ID 205 are significant only for entries with the stack type of "computing stack".

The architecture name field 203 is to set the name of the hardware architecture which the computing stack has. The stack manager 21 gets the architecture name 45 of the user-specified fundamental software 47 at the start-up of the access terminal 10, and compares it with architecture names 203 to thereby find a computing stack that can run the fundamental software 47 specified by the user.

The fundamental software name 204 and terminal ID 205 are to set the name of fundamental software in execution and the terminal ID of the access terminal 10 if the computing stack 30 of this entry 206 is assigned to the access terminal 10. Otherwise, "empty" is set to the fundamental software name 204 to indicate that the computing stack 30 of this entry is not in use by any user. The stack manager 21 finds an entry 206 with "empty" terminal ID 205 at the start-up of the access terminal 10, and assigns the computing stack 30 of this entry to the access terminal 10.

(3) Starting of Access Terminal by the User:

The procedure of start-up of the access terminal by the user, the execution of the fundamental software specified by the user, and the initiation of the user's application program will be explained first briefly in connection with FIG. 1.

The user turns on the access terminal 10. Then, the terminal-side loader 11 is run, and the user ID 14 and terminal ID 12 are sent to the stack manager 21, as indicated by line 101. The user ID 14 is sent to inform the application engine 3 of whichever fundamental software is to run, and the terminal ID 12 is sent to inform it of whichever access terminal the terminal-side program as a terminal-side fundamental software is to be sent. The user ID 14 is entered on the input device connected to the access terminal 10 which has been started by the user, as will be explained later.

Receiving the information 101, the stack manager 21 requests the file server 41 to find the personal files 42 of the user and the fundamental software 47 to thereby get the fundamental software name 44 and architecture name 45 intended by the user. Next, the stack manager 21 searches the stack table 22 for an empty computing stack having the user-specified architecture among the computing stacks 30 and 30'. Finally, the stack manager 21 requests the file server 41 to send the terminal-side program 48 for the user-specified fundamental software 47 to the access terminal 10, as indicated by a line 105, and send the stack-side program 49 to the computing stack 30, as indicated by a line 106, so that they run these programs as the terminal-side fundamental software 50 and stack-side fundamental software 60.

By following this procedure, the access terminal 10 started by the user runs the user-specified terminal-side fundamental software 50, and on the part of the application engine 3, the computing stack 30 having the suitable architecture runs the user-specified stack-side fundamental software 60. The computer system 5 is now ready to run an application program specified by the user, as will be explained later in connection with FIG. 3.

Figure 9:
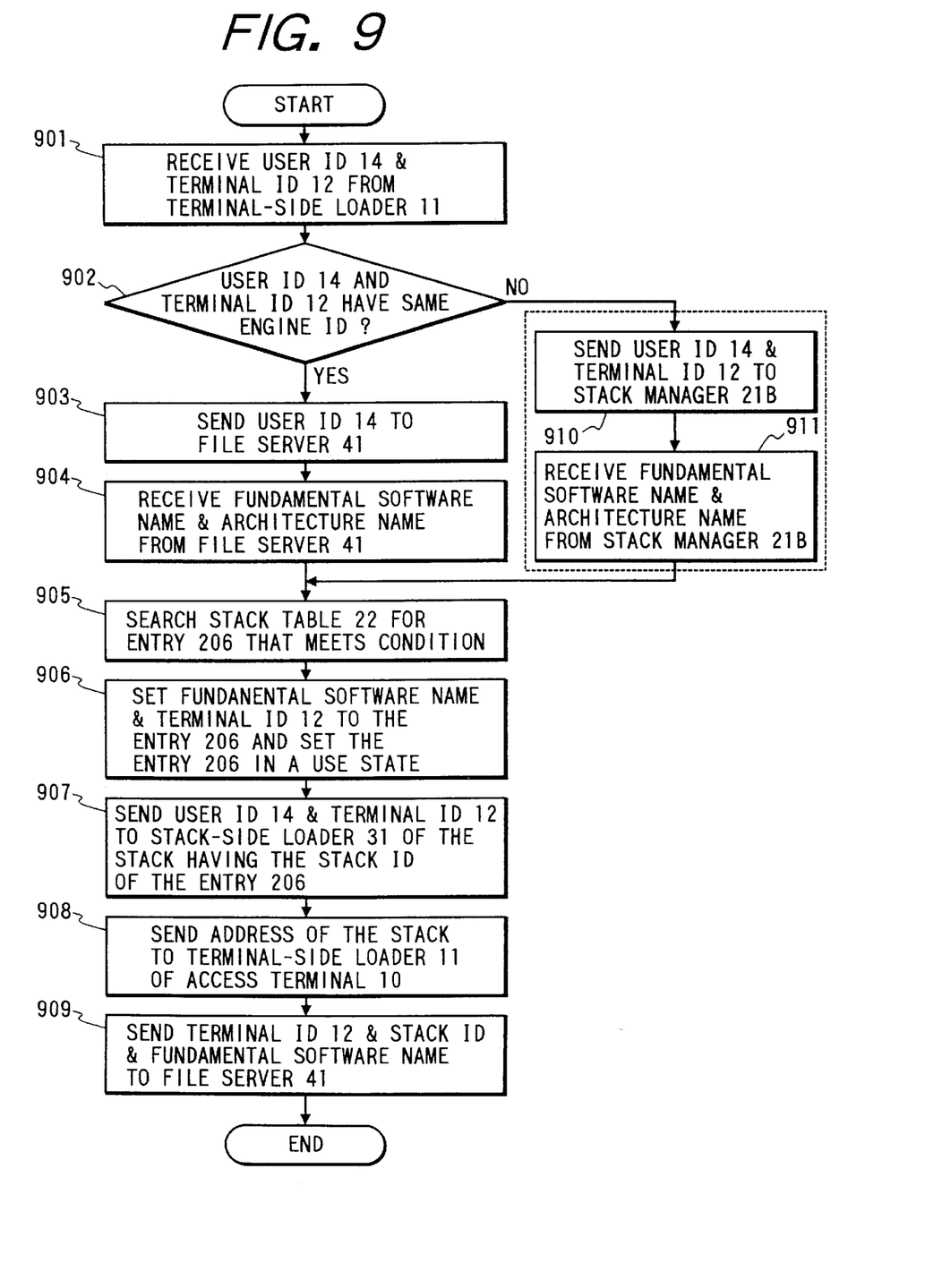
FIG. 9 is a flowchart showing the operation of the stack manager at the start-up of terminal.

Next, the foregoing procedure will be explained in more detail with reference to FIG. 1 and FIG. 9. FIG. 9 shows by flowchart the operation of the stack manager 21 at the start-up of the access terminal 10.

The user turns on the access terminal 10, and then the terminal-side loader 11 is run. The user enters his/her user ID 14, then it is fed to the terminal-side loader 11, which also reads out the terminal ID 12 which is preset in the access terminal 10 in consideration of the application engine. Specifically, the user enters the user ID 14 on the keyboard as an input device 17, and it is fed to the terminal-side loader 11. Alternatively, the user puts a card, on which the user ID 14 is recorded, into the card reader as an input device 17, then the access terminal 10 is turned on automatically and the user ID 14 is fed to the terminal-side loader 11.

The terminal-side loader 11 transfers the user ID 14 and terminal ID 12 to the stack manager 21 of the base stack 20, as indicated by lines 100 and 101. The terminal-side loader 11 gets the address of the base stack 20 from the terminal ID 12 (the base stack address has the same engine ID as of the terminal ID, and has an ID code and stack ID of "0"). Following the communication with the stack manager 21, the terminal-side loader 11 waits for incoming communication.

In FIG. 9, the stack manager 21 receives the communication 100 from the terminal-side loader 11 (step 901), and it examines the received user ID 14 (step 902). If the engine ID 801 of the user ID 14 coincides with the engine ID 802 of the address of the base stack 20, it sends the user ID 14 to the file server 41 of the storage stack 40, as indicated by a line 102 (step 903). In this case, the stack manager 21 gets the address of the storage stack 40 by searching the stack table 22 for a stack ID 201 of an entry 206 having a stack type 202 (shown in FIG. 2) of "storage stack". The procedure for the case of unequal engine IDs of the received user ID and base stack address will be explained later in connection with FIG. 6.

The file server 41, which has received the communication 102 from the stack manager 21, searches the storage stack 40, which stores multiple personal files 42 and 42', for a user file having its user ID 43 coincident with the received user ID 14. The file server 41 reads out the fundamental software name 44 from the detected personal files 42.

Subsequently, the file server 41 searches the storage stack 40, which stores multiple fundamental softwares 47, for a fundamental software having its name 54 coincident with the fundamental software name 44. It reads out the architecture name 45 from the detected fundamental software 47, and sends the architecture name 45 and fundamental software name 54 to the stack manager 21, as indicated by a line 108.

The stack manager 21, which has received the communication 108 from the file server 41 (step 904), searches the stack table 22 (explained on FIG. 2) for an entry with a stack type 202 of "computing stack", with a architecture name 203 coincident with the received architecture name 45, and with a terminal ID 205 of "empty" (step 905).

The stack manager 21 writes the fundamental software name 54, which has been received from the file server 41, into the fundamental software field 204 of the detected entry 206. It also writes the terminal ID 12, which has been received from the terminal-side loader 11, into the terminal ID field 205 of the entry 206 (step 906).

The stack manager 21 sends the user ID 14 and terminal ID 12 to the stack-side loader 31 of the computing stack 30 relevant to the stack ID 201 read out of the entry 206, as indicated by a line 107 (step 907). It generates an address of the computing stack 30 by combining the stack ID 201 and engine ID, and sends the address to the terminal-side loader 11 of the access terminal 10 (step 908). It thereafter sends the stack ID 201, terminal ID 12 and fundamental software name 54 to the file server 41, as indicated by line 109 (step 909).

The stack-side loader 31, which has received the communication 107 from the stack manager 21, waits for an incoming communication 104 from the file server 41.

The file server 41, which has received the communication 109 from the stack manager 21, searches the storage stack 40 for a fundamental software 47 having the received fundamental software name 54, reads out a terminal-side program 48 from the detected fundamental software 47, and sends it to the terminal-side loader 11 of the access terminal 10 relevant to the received terminal ID 12, as indicated by a line 103. The file server 41 thereafter reads out the stack-side program 49 from the fundamental software 47 and sends it to the stack-side loader 31 of the computing stack 30 relevant to the received stack ID 201, as indicated by line 104.

The terminal-side loader 11, which has received the communication 103 from the file server 41, writes the content of reception as a terminal-side fundamental software 50 into the main memory of the access terminal 10, and runs the software.

The stack-side loader 31, which has received the communication 104 from the file server 41, writes the content of reception as a stack-side fundamental software 60 into the main memory of the computing stack 30, and runs the software.

By following this procedure, the access terminal 10 started by the user runs the user-specified terminal-side fundamental software 50, and on the part of the application engine 3, the computing stack 30 having the suitable architecture runs the user-specified stack-side fundamental software 60. The computer system 5 is now ready to run an application program specified by the user, as will be explained later in connection with FIG. 3.

The foregoing embodiment of this invention has the following three major features.

First, each access terminal 10 has its terminal-side fundamental software 50 determined in response to the entry of a user ID 14 on the associated input device after the terminal has been turned on. Accordingly, even when another user intends to use the same access terminal 10 by specifying a fundamental software different from that of the previous user, no change is required of the latter user to change for the access terminal 10. Namely, each access terminal 10 can be used intact by any user.

Secondly, the stack table 22 of the base stack 20 exclusively administrates the status of the stacks of the application engine 3, and therefore the organization of the application engine 3 can be altered easily. For example, another computing stack 30 can be connected to the network 1 by simply adding an entry 206 to the stack table 22 and writing "computing stack" into the stack type field 202, writing proper items into the stack ID field 201 and architecture name field 203, and writing "empty" into fundamental software name field 204 and terminal ID field 205. Consequently, when the user starts the access terminal 10, the stack manager 21 can find the new entry 206 in step 905 of FIG. 9, and the new computing stack 30 becomes ready for use.

As another example, a computing stack 30 is replaced with another one having the same architecture due to the malfunctioning or for the enhancement of performance, as follows. At the time when the computing stack 30 in question becomes empty, i.e., when the terminal ID field 205 of the entry 206 for the computing stack 30 has become "empty", a value other than "empty" is written in it so that the stack manager 21 does not designate the computing stack 30. The computing stack 30 is disconnected from the network 1 and a new computing stack is connected. The entry 206 of the computing stack 30 is revised by writing "empty" into the terminal ID field, and the new computing stack becomes ready for use.

These examples based on this embodiment demonstrate the easy alteration of configuration of the application engine without requiring the stopping, and thus the easy operation, of the computer system 5.

Thirdly, information on the specification of fundamental softwares by individual users is registered in the storage stack 40 of the application engine 3, instead of the access terminal 10, and accordingly a user who has been using one access terminal can start and use another access terminal in exactly the same manner as the previous terminal by entering one's user ID 14 to the new terminal and running the user-specified fundamental software.

Moreover, the access terminal 10 started by a user sends the user ID 14 and terminal ID 12 to the base stack 20 of a specific application engine 3, as indicated by line 101. According to the above explanation, the stack manager 21, which has received the communication 101, operates on the file server 41 of the storage stack 40 within the application engine 3 to find the personal files 42 of the user. Namely, the preceding explanation premises that the user file 42 is stored in the storage stack 40 of the application engine 3 that is common to the base stack 20. The following explains with reference to FIG. 6 and FIG. 9 the procedure of running fundamental software when the personal files 42 are stored in other application engines.

Figure 6:
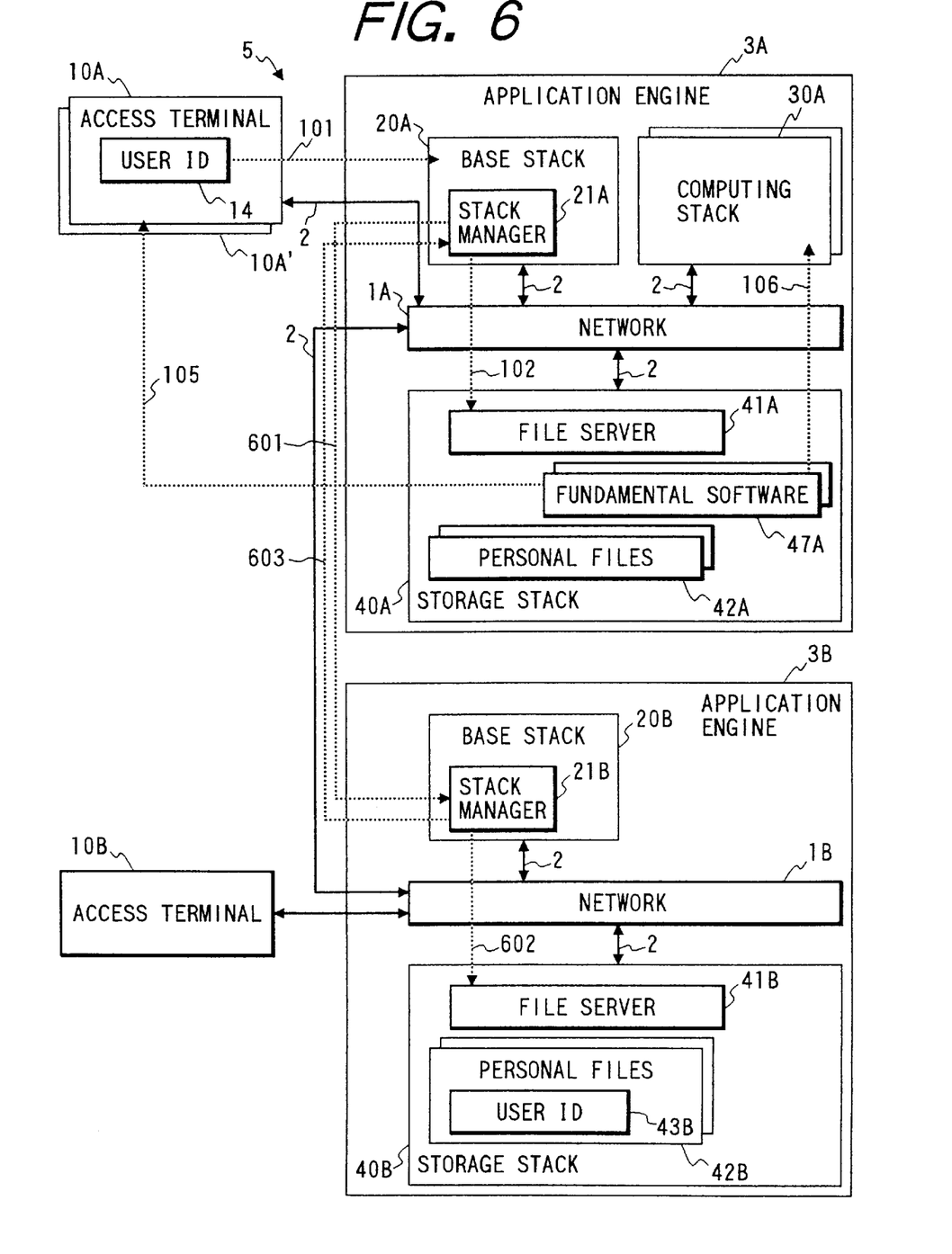
FIG. 6 is a block diagram showing the terminal start-up operation of the inventive computer system of the case of including multiple application engines.

FIG. 6 shows a computer system including two application engines 3A and 3B each having the same arrangement as the one shown in FIG. 1. The application engines 3A and 3B have their networks 1A and 1B connected by a cable 2 as shown in the figure, or connected through an existing network. Alternatively, the application engines 3A and 3B may be connected to a common network.

The user turns on the access terminal 10A, and the user ID 14 and terminal ID 12 are sent to the stack manager 21A of the base stack 20A. When the user has his/her personal files 42B stored in the storage stack 40B of the application engine 3B, the judgment step 902 of FIG. 9 is negated, and the stack manager 21A transfers the user ID 14 and terminal ID 12 to the stack manager 21B, as indicated by line 601 (step 910). The address of the base stack 20B which runs the stack manager 21B is known from the engine ID 801 of the user ID 14 shown in FIG. 8.

The stack manager 21B requests that the file server 41B find personal files 42B that have a user ID 43B equal to the received user ID, as indicated by line 602, to thereby get the fundamental software name 44B and architecture name 45B (not shown in FIG. 6) specified by the user. The manner of search is identical to the procedure explained on FIG. 1.

The stack manager 21B sends the fundamental software name 44B and architecture name 45B to the stack manager 21A, as indicated by line 603. Receiving the communication from the stack manager 21B (step 911), the stack manager 21A proceeds to step 905 of FIG. 9 and carries out the remaining procedure explained previously. Specifically, it determines a computing stack 30A and sends the terminal ID etc. to the file server 41, as indicated by a line 109, and the fundamental software 47A specified by the user is sent to the access terminal 10A and computing stack 30A, as indicated by lines 105 and 106.

According to this embodiment, even if the user turns on an access terminal 10A, with the personal files being absent in the application engine 3A to which the access terminal 10A has an initial communication, the fundamental software specified by the user can be run by the access terminal 10A based on the communication between the stack manager 21A and stack manager 21B in exactly the same manner as the case of the presence of the user file in the access terminal 10A. Namely, the computer system of this embodiment having two or more application engines connected by a network and addressed each other for communication allows users to use arbitrary access terminals installed in different locations.

Some variant embodiments of the foregoing methods of starting the access terminal will be explained.

One variant embodiment pertains to the step of sending the user ID 14 from the terminal-side loader 11 to the stack manager 21, as indicated by line 100 in FIG. 1. This embodiment is designed to send the fundamental software name specified by the user in addition to the user ID 14. Accordingly, the terminal-side loader 11 of the access terminal 10 turned on by the user prompts the user to enter a user ID and fundamental software name. The stack manager 21, which has received the user ID 14 and fundamental software name, sends the fundamental software name to the file server 41 in a step similar to step 903 (or 910) of FIG. 9. Then, the file server 41 finds a fundamental software 47 and sends an architecture name 45 relevant to the fundamental software 47 to the stack manager 21, which receives it in a step similar to step 904 (or 911) of FIG. 9. The subsequent operations are identical to the preceding embodiment. This variant embodiment allows the user to choose a fundamental software when turning on the access terminal 10, and it is useful for the user who intends to use various fundamental software for application programs.

Another variant embodiment pertains to the treatment of a computing stack 30 that is not assigned to any user. This embodiment is designed to include a power controller in the application engine 3 so that the stack manager 21 controls the power supply to individual computing stacks. Specifically, the stack manager 21 does not feed power to stacks of entries having a fundamental software name of "empty" in the stack table 22. The stack manager 21 turns on power of the stack of the entry 206 following a step similar to step 906 of the preceding embodiment of finding an entry that meets the condition. The remaining operations are identical to the preceding embodiment. This variant embodiment is capable of minimizing the power consumption of the application engine 3 and thus the whole computer system.

(4) Operation of Computer System by the User After the Access Terminal is Turned On:

After a user has turned on the access terminal 10 as described in the foregoing embodiments, the user uses the computer system 5 to run his/her application program on the assigned computing stack 30. Initially, the operation of a general computer system by a user will be explained with reference to FIG. 4. In the figure, the user uses a computer system 400 to run an application program 7. The computer system 400 consists of one or more computers (not shown). The application program 7 and fundamental software 401 are loaded into the main memory of one computer and executed by one or more processors in the computer. The user has his/her user file 411 stored in a storage device 410 of the computer.

Figure 4:
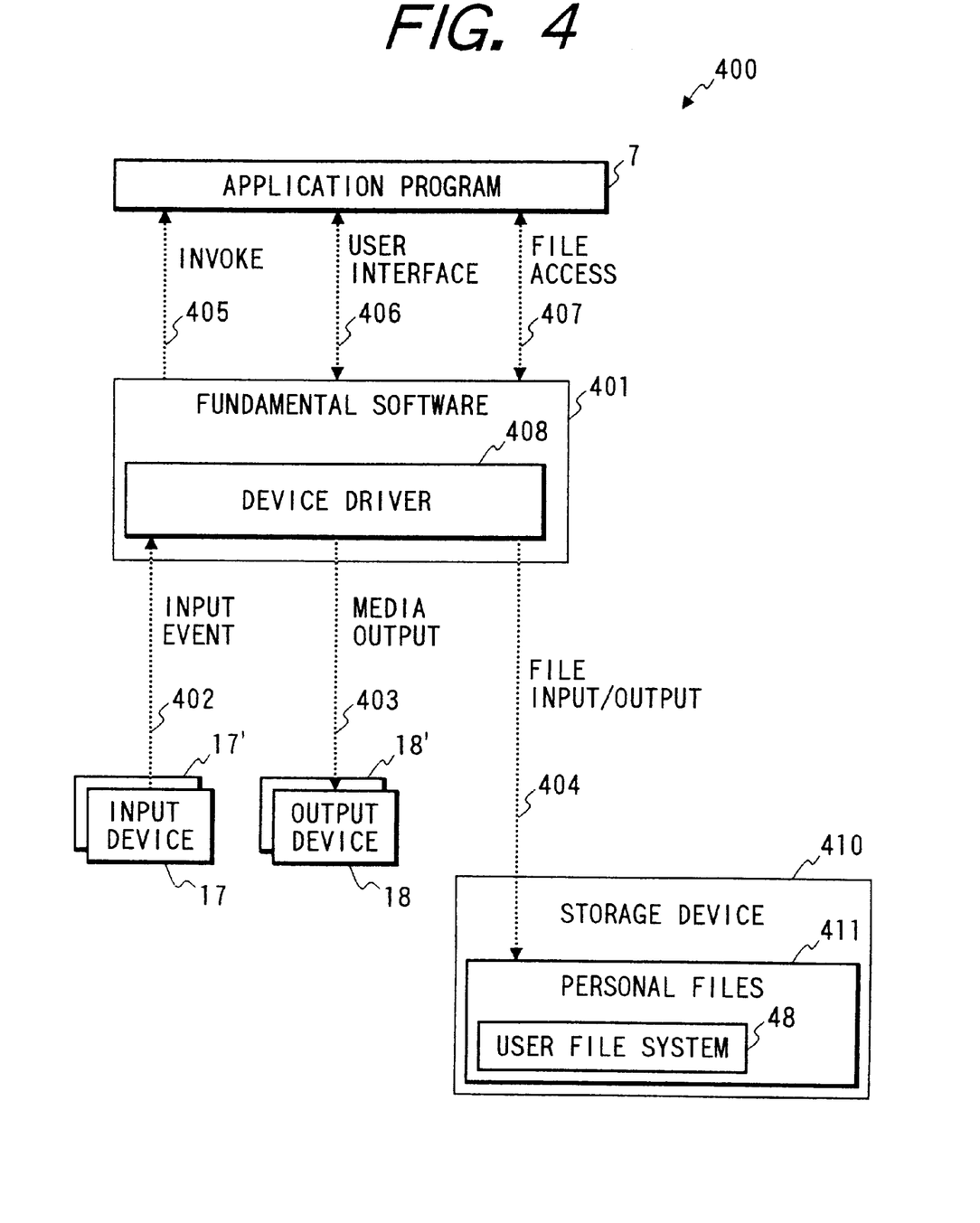
FIG. 4 is a block diagram showing the operation of a conventional computer system during the execution of a user's application program.

The fundamental software 401 can install a device driver 408 which is generally a set of independent programs. The device driver 408, which has been developed separately, is interfaced properly with other programs within the fundamental software 401 so that it does not adversely affect the fundamental software 401. The fundamental software 401 does not directly deal with input events 402 on the input devices 17 and 17' such as a keyboard and mouse device operated by the user, media outputs 403 to the output devices 18 and 18' such as a display unit and speaker, and file input/output 404 with the storage device 410, but these operations take place by way of the device driver 408 through the interface determined by the fundamental software 401.

The application program 7 is run under control of the fundamental software 401. The user initially feeds the intended application program to the fundamental software 401 through the input device 17. The fundamental software 401 loads the application program 7 into the main memory and initiates the program, as indicated by a line 405.

After the application program 7 has started, the user input event 402 from the input devices 17 and 17' are introduced to the application program 7 by way of the fundamental software 401 as shown by user interface 406 and the media outputs 403 produced by the application program 7 are delivered to the output devices 18 and 18' by way of the fundamental software 401 as shown by user interface 406. Similarly, the application program 7 has file input/output 404 by accessing the user file system 48 of the user file 411 in the storage device 410 by way of the fundamental software 401 as shown by file access 407.

Next, the operation of the computer system 5 in executing the application program on the computing stack 30 assigned to the access terminal 10 which has been turned on by the user will be explained with reference to FIG. 3. After the access terminal 10 has started, it has the assignment of a computing stack 30, and the terminal-side fundamental software 50 is run by the access terminal 10 and the stack-side fundamental software 60 is run by the computing stack 30, as explained in connection with FIG. 1 and FIG. 9.

The terminal-side fundamental software 50 has the stack address 51 sent from the stack manager 21 in step 908 of FIG. 9. The stack-side fundamental software 60, in which the device driver 8 is installed, has the user ID 81 and terminal ID 82 sent from the stack manager 21 in step 907 of FIG. 9. The device driver 8 may be installed by the stack-side fundamental software 60 by itself after it is run at the start-up of the access terminal 10, instead of being installed in it from the beginning.

The application program 7 is run under control of the stack-side fundamental software 60. The user operates the input device 17 to specify an application program to be run. A series of input events 302 caused by this operation are received by the terminal-side fundamental software 50, which converts the inputs 302 into data that can be transmitted through the network 1 and sends the data to the device driver 8 in accordance with the stack address 51, as indicated by line 301. The device driver 8 implements the data conversion and passes the resulting data to the stack-side fundamental software 60. The stack-side fundamental software 60 responds to the input to load the application program 7 into the main memory and starts the program, as indicated by a line 305.

After the application program 7 has started, the input events 302 from the input devices 17 and 17' are introduced to the application program 7 as shown by user interface 306 by way of the terminal-side fundamental software 50, device driver 8 and stack-side fundamental software 60. The outputs of the application program 7 are sent to the stack-side fundamental software 60 as shown by user interface 306, by which the outputs are passed to the device driver 8. The device driver 8 converts the outputs into data that can be transmitted through the network 1 and sends the data to the terminal-side fundamental software 50 in accordance with the terminal address 82, as indicated by a line 301. The terminal-side fundamental software 50 implements the data conversion and delivers the resulting media outputs 403 to the output devices 18 and 18'.

Similarly, the application program 7 has a file access 307 by sending a request accompanied by the user ID 81 and the address of computing stack 30 to the file server 41 of the storage stack 40 by way of the stack-side fundamental software 60 and device driver 8, as indicated by a line 304. The file server 41, which has received the request, implements the file access operation of the application program 7 for the user file system 48 of the personal files 42 which are stored in the storage device (not shown in FIG. 3) of the storage stack 40. The specified file is delivered to the application program 7 by way of the file server 41, device driver 8 and stack-side fundamental software 60.

Figure 3:
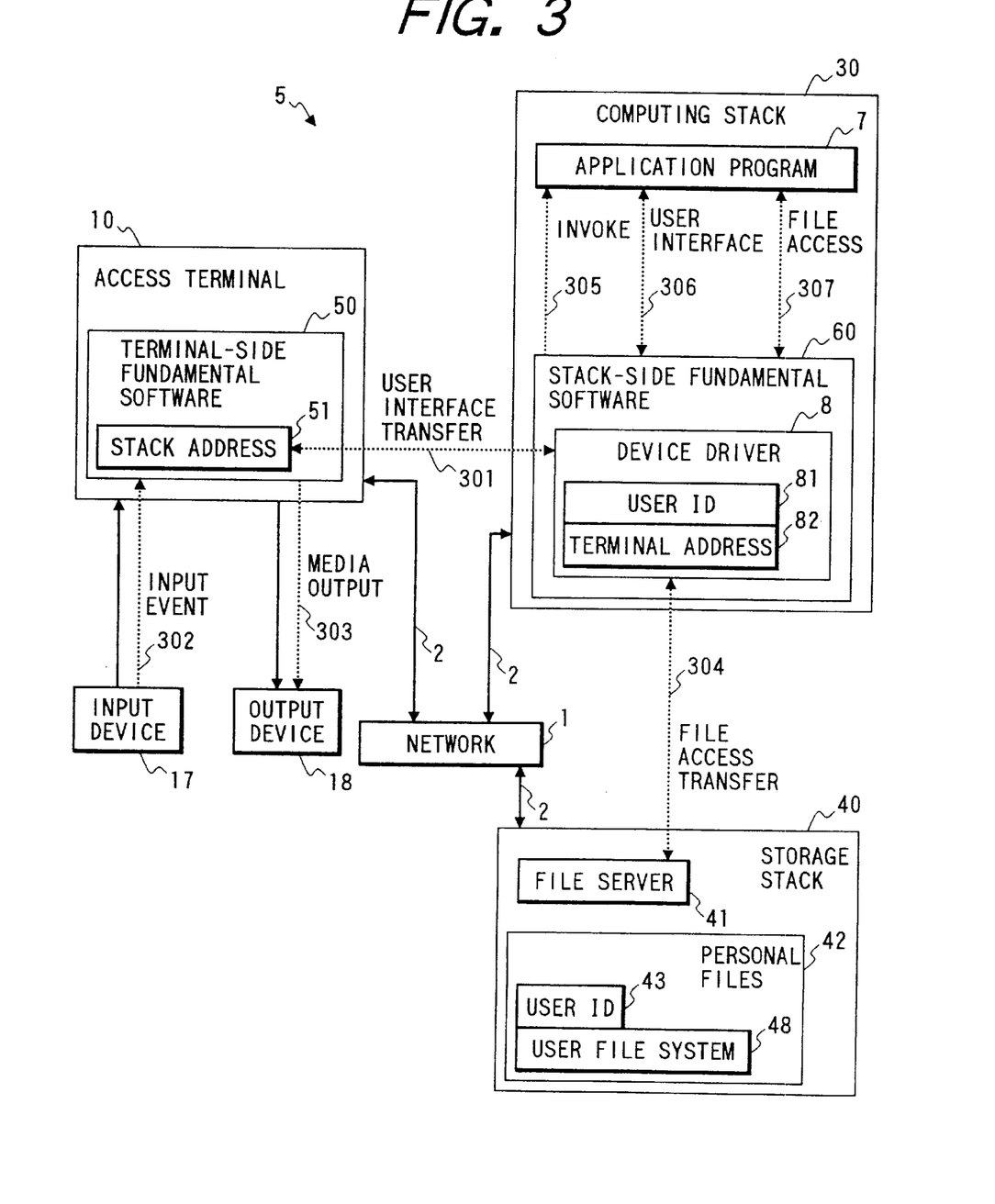
FIG. 3 is a block diagram showing the operation of the computer system of this embodiment during the execution of a user's application program.

Comparing FIG. 4 with FIG. 3 reveals the following three major features of this embodiment.

First, the user inputs and application program outputs are transferred to the application program 7 and output devices 18 and 18' automatically by the functions of the terminal-side fundamental software 50 and device driver 8. The application program 7 is run on the computing stack 30 having the architecture capable of running the user-specified fundamental software irrespective of the architecture of the access terminal 10. Accordingly, the access terminal 10 is seen from a user of the computer system 5 as a computer that has the architecture for running the user-specified fundamental software and is capable of running intended application programs.

Secondly, by having the terminal-side fundamental software 50 and device driver 8 developed specially for the computer system 5 of this embodiment, existing fundamental software can be used intact for the stack-side fundamental software, as will be appreciated from the comparison of FIG. 3 and FIG. 4. Accordingly, the computer system 5 of this embodiment can offer a variety of fundamental softwares to be selected by the user of the access terminal 10 irrespective of the architecture of the access terminal 10.

Thirdly, the access terminal 10 can be a computer that is merely capable of running the terminal-side fundamental software 50 that has a function of transferring the input events 302 and media outputs 303. Accordingly, the access terminal 10 can be inexpensive, and it can be used intact even when a high-performance computing stack 30 is installed to meet the user's demand in the future for example. Consequently, the long-term running cost of the computer system 5 can be lower than the conventional computer system mentioned previously.

The present invention accomplishes the computer system which enables easy introduction of application programs and installation of computers for running application programs, thereby attaining extensive user's demands. The present invention offers a variety of fundamental softwares and architectures, allowing users to run their application programs with the feel of operating personal computers that are based on particular fundamental software.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A computer system, comprising:

at least one first computer having a user interface function;

at least one second computer which executes a plurality of groups of application programs, execution of each of said groups of application programs being controlled by a corresponding one of a plurality of predetermined fundamental software which is loaded into said at least one second computer; and a third computer which is connected to said at least one first computer and said at least one second computer and loads one of said plurality of predetermined fundamental software which is specified through the user interface function of said at least one first computer, into said at least one second computer.

2. A computer system according to claim 1, wherein said plurality of predetermined fundamental software run said plurality of groups of application programs.

3. A computer system according to claim 1, wherein said at least one second computer and said third computer are accommodated in a same cabinet.

4. A computer system according to claim 1, wherein said third computer has a power source that is independent from a power source of said at least one second computer.

5. A computer system according to claim 4, wherein said third computer controls the power source of said at least one second computer.

6. A computer system according to claim 1 comprising:

a plurality of said computer systems; and a network which links said plurality of computer systems.

7. A computer system according to claim 1, wherein said plurality of predetermined fundamental software includes operating systems of said at least one second computer.

8. A method of operation of a computer system which comprises at least one first computer, at least one second computer, a third computer and a communication path which connects said at least one first computer, said at least one second computer and said third computer, and which execute a plurality of groups of application programs each under control of a corresponding one of a plurality of predetermined fundamental software, said method comprising:

transferring a request which has been input to said at least one first computer by a user, from said at least one first computer to said third computer;

deciding, by said third computer, one of said plurality of predetermined fundamental software requested by said request;

loading, by said third computer, said decided one fundamental software into said at least one second computer;

invoking said loaded one fundamental software; and enabling by said third computer, communication between said at least one first computer and said at least one second computer.

9. A computer operation method according to claim 8, wherein said loaded one fundamental software includes an operating system of said at least one second computer.

10. A computer system, comprising:

a first computer having a user interface function for a user thereof to specify one of a plurality of predetermined software each of which controls execution of a corresponding group of application programs;

a plurality of second computers each of which executes a group of application programs under control of a corresponding one of said plurality of predetermined software which is loaded into each of said second computers;

a third computer which determines one of said plurality of second computers into which said specified one software is to be loaded; and a network which connects said first computer, said plurality of second computers and said third computer.

11. A computer system according to claim 10, wherein said third computer further loads said specified software into said one second computer determined by said third computer.

12. A computer system to be used by user through at least one first computer, comprising:

at least one second computer for which a plurality of fundamental software any of which can run on said at least one second computer are predetermined; and a third computer which is connected to said at least one second computer and is to be connected to said at least one first computer, and which receives a request transferred from said at least one first computer and loads one of said plurality of predetermined fundamental software requested by said request into said at least one second computer.

13. A computer system according to claim 12, wherein each of said plurality of predetermined fundamental software includes a group of programs including an operating system, for controlling execution of at least one application program executable on said operating system and for controlling execution of input operations indicated to and output operations indicated by one of said operating system and an application program invoked thereon.

14. A computer system network to be used by a user through at least one first computer, comprising:
a plurality of computer systems; and
a network which links said plurality of computer systems:
wherein each computer system comprises:
at least one second computer for which a plurality of fundamental software, any of which can run on said at least one second computer, are predetermined, and
a third computer which is connected to said at least one first computer and said at least one second computer and which receives a request transferred from said at least one first computer to said each computer system and loads a requested one of said plurality of predetermined fundamental software into said at least one second computer of said each computer system.

15. A computer system according to claim 14, wherein each of said plurality of predetermined fundamental software includes an operating system for controlling execution of at least one application program executable on said operating system and for controlling execution of input operations indicated to and output operations indicated by one of said operating system and an application program invoked thereon.

16. A method of operation of a computer system to be used by a user through at least one first computer which includes at least one input device and at least one output device, wherein said computer system comprises at least one second computer, a third computer and a communication path which connects said at least one first computer, said at least one second computer and said third computer, wherein a plurality of fundamental software, any of which can run on said at least one second computer, are predetermined, said method comprising the steps of:
receiving by said third computer, a request transferred from said at least one first computer by way of said communication path;
loading by said third computer, a requested one of said plurality of predetermined fundamental software into said at least one second computer;
invoking said one loaded predetermined fundamental software; and
communicating by said one predetermined fundamental software invoked on said at least one second computer with said at least one first computer by way of said communication path, so that said one predetermined fundamental software receives input operations indicated by a user by means of said at least one input device included in said at least one first computer, from said at least one first computer, as input operations to be processed by one of said one predetermined fundamental software and an application program invoked thereon, and so that output operations indicated by one of said one predetermined fundamental software and said application program invoked thereon are transferred to said at least one first computer as output operations to be executed by said at least one output device.

17. A computer operation method according to claim 16, wherein said one loaded predetermined fundamental software includes an operating system for controlling execution of at least one application program executable on said operating system and for controlling execution of input operations indicated to and output operations indicated by one of said operating system and an application program invoked thereon.

18. A computer system to be used by a user through a first computer, comprising:
a plurality of second computers for which a plurality of fundamental software are predetermined, wherein at least one of said plurality of predetermined software can run on each of said plurality of second computers;
a third computer which receives a request transferred from said at least one first computer and determines one of said plurality of second computers into which a requested one of said plurality of predetermined fundamental software is to be loaded; and
a network which connects said first computer, said plurality of second computers and said third computer.

19. A computer system according to claim 18, wherein said third computer further loads said one requested predetermined fundamental software into said one second computer determined by said third computer.

20. A computer system to be to used by users through a plurality of first computers by a network, comprising:
a plurality of second computers to be connected to said plurality of first computers by said network; and
a third computer connected to said plurality of second computers and to be connected to said plurality of first computers by said network;
wherein a plurality of fundamental software, each of which runs on at least one of said plurality of second computers, are predetermined;
wherein said third computer is programmed so as to receive request information transferred from one of said plurality of first computers by said network, so as to select one of said plurality of second computers and so as to invoke one of said plurality of predetermined fundamental software requested by said request information on said one selected second computer;
wherein each predetermined fundamental software includes a group of programs including an operating system for controlling execution of at least one application program executable on said operating system and for controlling execution of input operations indicated to and output operations indicated by one of said operating system and an application program invoked thereon;
wherein said one invoked predetermined fundamental software is programmed to receive, from said one first computer by said network input operations indicated by user by means of said at least one input device included in said one first computer, as input operations to be processed by one of said one invoked predetermined fundamental software and an application program invoked thereon; and
wherein said one invoked predetermined fundamental software is further programmed to transfer output operations indicated by one of said one predetermined fundamental software and said application program invoked thereon, to said one first computer by said network, as output operations to be executed by said at least one output device included in said one first computer.

21. A computer system according to claim 20, further comprising a storage device connected to said plurality of second computers which stores said plurality of predetermined fundamental software;

wherein said third computer is programmed to load said one predetermined fundamental software from said storage device into said one selected second computer before invoking said one predetermined fundamental software.

22. A computer system according to claim 20, wherein at least one of said plurality of second computers differs in hardware structure from at least one other thereof such that said at least one second computer runs one of said plurality of predetermined fundamental software but said at least one other second computer cannot run said one predetermined fundamental software, and that said at least one other second computer can run another of said plurality of predetermined fundamental software but said at least one second computer cannot run said another predetermined fundamental software.

23. A computer system according to claim 21, wherein said storage device further stores a plurality of other predetermined fundamental software each of which can be run on at least one of said plurality of first computers and each of which is provided in correspondence to one of said plurality of predetermined fundamental software;

wherein each other predetermined fundamental software includes a group of programs including an operating system for controlling execution of at least one application program executable on said operating system and for controlling execution of input operations indicated to and output operations indicated by one of said operating system and an application program invoked thereon; and wherein said third computer is further programmed to transfer to said one first computer, in response to receipt of said request information, one of said plurality of other predetermined fundamental software corresponding to said one predetermined fundamental software requested by said request information, as fundamental software to be loaded on said one first computer.

24. A computer readable program recording medium which stores a computer program for a computer system to be used by users through a plurality of first computers a network, each of said plurality of first computers including at least one input device and at least one output device, said computer system comprising:

a plurality of second computers to be connected to said plurality of first computers by way of said network; and a third computer connected to said plurality of second computers and connected to said plurality of first computers by said network, wherein a plurality of fundamental software, each of which can run on at least one of said plurality of second computers, are predetermined, and wherein said computer program is programmed to cause said third computer to select, in response to request information transferred from one of said plurality of first computers by way of said network, one of said plurality of second computers, and invoke one of a plurality of predetermined fundamental software requested by said request information, on said one selected second computer;

wherein each predetermined fundamental software includes a group of programs including an operating system for controlling execution of at least one application program executable on said operating system and for controlling execution of input operations indicated to and output operations indicated by one of said operation system and an application program invoked thereon;

wherein said one invoked predetermined fundamental software is programmed to receive, from said one first computer by way of said network, input operations indicated by a user by means of said at least one input device included in said one first computer, as input operations to be processed by one of said one requested predetermined fundamental software and an application program invoked thereon; and wherein said one invoked predetermined fundamental software is further programmed to transfer output operations indicated by one of said one predetermined fundamental software and said application program invoked thereon to said one first computer by way of said network, as output operations to be executed by said at least one output device included in said one first computer.

25. A computer program recording medium according to claim 24, wherein said computer system further includes a storage device connected to said plurality of second computers which stores said plurality of predetermined fundamental softwares, wherein said computer program is further programmed to cause said third computer to load said one predetermined fundamental software from said storage device into said one selected second computer before invoking said one of a plurality of predetermined software requested by said request information.

* * * * *